(12) United States Patent
Diao et al.

(10) Patent No.: US 8,699,796 B1
(45) Date of Patent: Apr. 15, 2014

(54) IDENTIFYING SENSITIVE EXPRESSIONS IN IMAGES FOR LANGUAGES WITH LARGE ALPHABETS

(75) Inventors: Lili Diao, JiangSu (CN); Jonathan J. Oliver, Kew (AU)

(73) Assignee: Trend Micro Incorporated, Tokyo (JP)

( * ) Notice: Subject to any disclaimer, the term of this patent is extended or adjusted under 35 U.S.C. 154(b) by 1375 days.

(21) Appl. No.: 12/268,714

(22) Filed: Nov. 11, 2008

(51) Int. Cl.
G06K 9/00 (2006.01)
G06F 17/24 (2006.01)

(52) U.S. Cl.
CPC .......... *G06F 17/243* (2013.01); *G06K 9/00865* (2013.01)
USPC .......................................................... 382/181

(58) Field of Classification Search
USPC ..................................... 382/161, 181; 706/16
See application file for complete search history.

(56) References Cited

U.S. PATENT DOCUMENTS

| | | | |
|---|---|---|---|
| 6,052,709 A | 4/2000 | Paul | |
| 6,389,166 B1 | 5/2002 | Chang et al. | |
| 7,117,358 B2 | 10/2006 | Bandini et al. | |
| 7,184,160 B2 | 2/2007 | El-Gazzar et al. | |
| 7,257,564 B2 * | 8/2007 | Loughmiller et al. | 706/16 |
| 7,320,020 B2 | 1/2008 | Chadwick et al. | |
| 2002/0067509 A1 * | 6/2002 | Roylance | 358/2.1 |
| 2003/0138144 A1 * | 7/2003 | Lynggaard | 382/181 |
| 2005/0114457 A1 * | 5/2005 | Shih | 709/206 |
| 2005/0185841 A1 * | 8/2005 | Tyan et al. | 382/181 |
| 2008/0069447 A1 | 3/2008 | Hotta et al. | |

OTHER PUBLICATIONS

Mehran Sahami, et al., "A Bayesian Approach to Filtering Junk E-Mail", Jul. 27, 1998, 8 sheets, AAAI'98 Workshop on Learning for Text Categorization, Madison, Wisconsin.
SURBL—home.html version 1.00 on Oct. 9, 2008, 1 sheet [retrieved on Feb. 13, 2009]. Retrieved from the internet: http://www.surbl.org/.

* cited by examiner

*Primary Examiner* — Hadi Akhavannik
(74) *Attorney, Agent, or Firm* — Okamoto & Benedicto LLP

(57) ABSTRACT

One embodiment relates to a method of identifying sensitive expressions in images for a language with a large alphabet. The method is performed using a computer and includes (i) extracting an image from a message, (ii) extracting image character-blocks (i.e. normalized pixel graphs) from the image, and (iii) predicting characters to which the character-blocks correspond using a multi-class learning model, wherein the multi-class learning model is trained using a derived list of sensitive characters which is a subset of the large alphabet. In addition, (iv) the characters may be combined into string text, and (v) the string text may be searched for matches with a predefined list of sensitive expressions. Another embodiment relates to a method of training a multi-class learning model so that the model predicts characters to which image character-blocks correspond. Other embodiments, aspects and features are also disclosed herein.

20 Claims, 9 Drawing Sheets

IDENTIFYING SENSITIVE EXPRESSIONS IN IMAGES FOR LANGUAGES WITH LARGE ALPHABETS

BACKGROUND

1. Technical Field

The present invention relates generally to optical character recognition and computer security.

2. Description of the Background Art

Electronic mail ("email") has become a relatively common means of communication among individuals with access to a computer network, such as the Internet. Among its advantages, email is relatively convenient, fast, and cost-effective compared to traditional mail. It is thus no surprise that a lot of businesses and home computer users have some form of email access. Unfortunately, the features that make email popular also lead to its abuse. Specifically, unscrupulous advertisers, also known as "spammers," have resorted to mass electronic mailings of advertisements over the Internet. These mass emails, which are also referred to as "spam emails" or simply "spam," are sent to computer users regardless of whether they asked for them or not. Spam includes any unsolicited email, not just advertisements. Spam is not only a nuisance, but also poses an economic burden.

Previously, the majority of spam consisted of text and images that are linked to websites. In the last few years, spammers are sending spam with an image containing the inappropriate content (i.e., the unsolicited message). The reason for embedding inappropriate content in an image is that spam messages can be distinguished from normal or legitimate messages in at least two ways. For one, the inappropriate content (e.g., words such as "Viagra", "free", "online prescriptions," etc.) can be readily detected by keyword and statistical filters (e.g., see Sahami M., Dumais S., Heckerman D., and Horvitz E., "A Bayesian Approach to Filtering Junk E-mail," AAAI'98 Workshop on Learning for Text Categorization, 27 Jul. 1998, Madison, Wis.). Second, the domain in URLs (uniform resource locators) in the spam can be compared to databases of known bad domains and links (e.g., see Internet URL <http://www.surbl.org/>).

In contrast, a spam email where the inappropriate content and URLs are embedded in an image may be harder to classify because the email itself does not contain obvious "spammy" textual content and does not have a link/domain that can be looked up in a database of bad links/domains.

Similarly, other messages (besides email) may also have embedded images with sensitive text content. It may be desirable to filter the messages for such image-embedded text content, for example, for data leakage or compliance applications.

Extracting text content from images can be a difficult problem, especially for identifying languages with large alphabets (character sets) such as Chinese, Japanese, and other languages with large numbers of characters. The large alphabets (character sets) for Chinese and Japanese each include over two thousand distinct characters. Such languages cause automatic content filtering software to be less useful when dealing with images. For example, an anti-spam engine may fail to detect a spam email with only a picture in it and what the spam email want to say are represented by image format.

Using OCR (optical character recognition) techniques to identify spam images (i.e., images having embedded "spammy" content) have been proposed because OCR can be used to identify text in images. In general, use of OCR for anti-spam or other content-sensitive message filtering applications would involve performing OCR on an image to extract text from the image, and comparing the extracted text with pre-defined spammy or other content-sensitive terms to determine if the image contains that content.

SUMMARY

One embodiment relates to a method of identifying sensitive expressions in images for a language with a large alphabet. The method is performed using a computer and includes (i) extracting an image from a message, (ii) extracting image character-blocks (i.e. normalized pixel graphs) from the image, and (iii) predicting characters to which the character-blocks correspond using a multi-class learning model, wherein the multi-class learning model is trained using a derived list of sensitive characters which is a subset of the large alphabet. In addition, (iv) the characters may be combined into string text, and (v) the string text may be searched for matches with a derived list of sensitive expressions.

Another embodiment relates to a method of training a multi-class learning model so that the model predicts characters to which image character-blocks correspond. The method is performed using a computer and includes providing a set of sample messages with sensitive expressions in a language with a large alphabet, wherein the sensitive expressions are embedded in images, extracting said images from the sample messages, extracting image character-blocks from said images, and receiving correlations between the image-character blocks and corresponding characters in said language. The image character-blocks are converted to feature vectors with the corresponding characters as class labels for the feature vectors. The feature vectors and the class labels are used to train said learning model.

Another embodiment relates to a method of detecting predefined sensitive expressions in images. The method is performed by a computer and includes (i) extracting an image from a computer-readable message, (ii) extracting image expressions from the image, and (iii) determining whether the image expressions match with a predefined list of sensitive expressions. Said determining may be performed using a multi-class learning model, wherein each class represents a distinct sensitive expression.

Other embodiments, aspects and features are also disclosed herein.

The use of the same reference label in different drawings indicates the same or like components.

DETAILED DESCRIPTION

While conventional OCR technologies may work reasonably well for identifying regularly printed western languages in images, they have weaknesses and disadvantages in the context of spam identification or other content filtering when the content is embedded in images. It is particularly problematic for conventional OCR technologies when the embedded content is in a language with a large alphabet (i.e. a large character set), such as an East Asian languages (for example, Chinese or Japanese).

First, conventional OCR technologies are generally slow in identifying text in an image. This relatively slow speed makes it impractical to use conventional OCR technologies for real-time anti-spam or other content filtering compliance modules which need to be able to scan a large number of email messages in a limited amount of time.

Second, conventional OCR technologies typically perform poorly outside of regularly printed western languages. For example, conventional OCR technologies do not usually handle handwritten Western languages very well. Performance is typically even worse when conventional OCR technologies attempt to identify words or phrases in East Asian languages (for example, Chinese or Japanese) from images. This is because such East Asian languages have many, many more characters than Western languages. For an East Asian language, such as Chinese, there are more than 3,000 frequently-used characters and symbols. As such, a conventional OCR technology requires a much longer time to compare all possible characters against the image data. The identification error rate is much higher when conventional OCR is applied to East Asian languages.

The methods and apparatus described herein may be advantageously utilized to implement a real-time, or close to real-time, algorithm to parse sensitive words and/or phrases from an image. The methods and apparatus described herein may be applied successfully even for images containing characters in East Asian languages.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
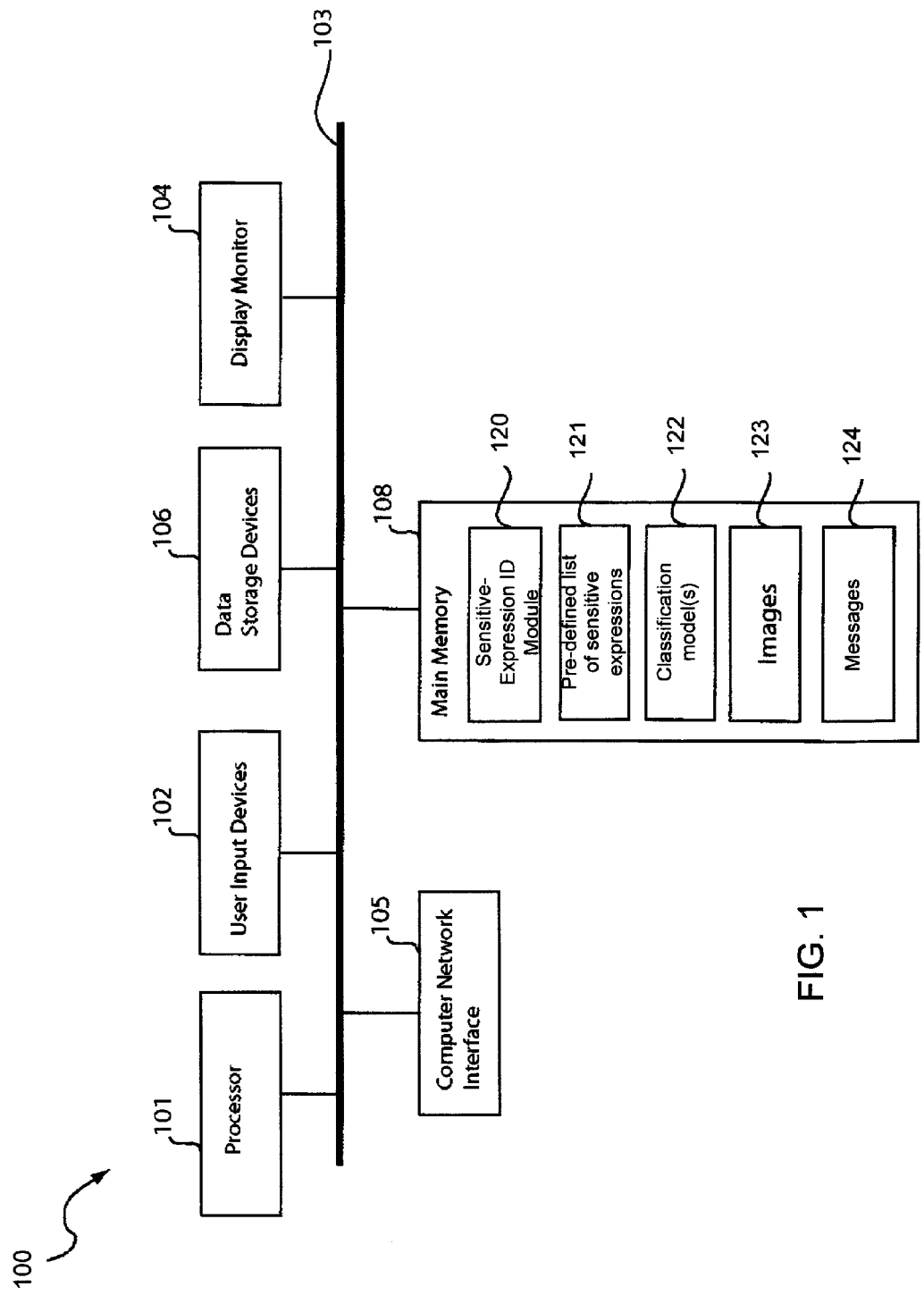
FIG. 1 is a schematic diagram of a computer in accordance with an embodiment of the present invention.

Referring now to FIG. 1, there is shown a schematic diagram of a computer 100 in accordance with an embodiment of the present invention. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 1, the main memory 108 includes a sensitive-expression ID module 120, a predefined list of sensitive expressions 121, a classification model or models 122, images 123, and messages 124. The components shown as being in the main memory 108 may be loaded from a data storage device 106 for execution or reading by the processor 101. The sensitive-expression identification (ID) module 120 may comprise computer-readable program code configured to identify sensitive words and/or phrases in images 123 for a language with a large alphabet, such as an East Asian language. For example, the sensitive-expression ID module 120 may be configured to implement one of the methods (600 or 800) discussed in further detail below in relation to FIG. 6 or 8.

The predefined list of sensitive expressions 121 may comprise words, phrases, terms, or other character combinations or strings that may be present in spam images, or may be terms identified by a person (such as the term "confidential information"). The expressions may be obtained from samples of confirmed spam emails, for example.

The messages 124 may comprise emails received over the computer network interface 105 or other means. The images 123 may comprise images extracted from the messages 124. The images 124 may be in any conventional image format including JPEG, TIFF, etc.

The present application discloses an advantageous machine learning system which includes a training procedure and an application procedure. An exemplary training procedure 200 is described below in relation to FIG. 2. An exemplary application procedure 600 is described below in relation to FIG. 6.

Figure 2:
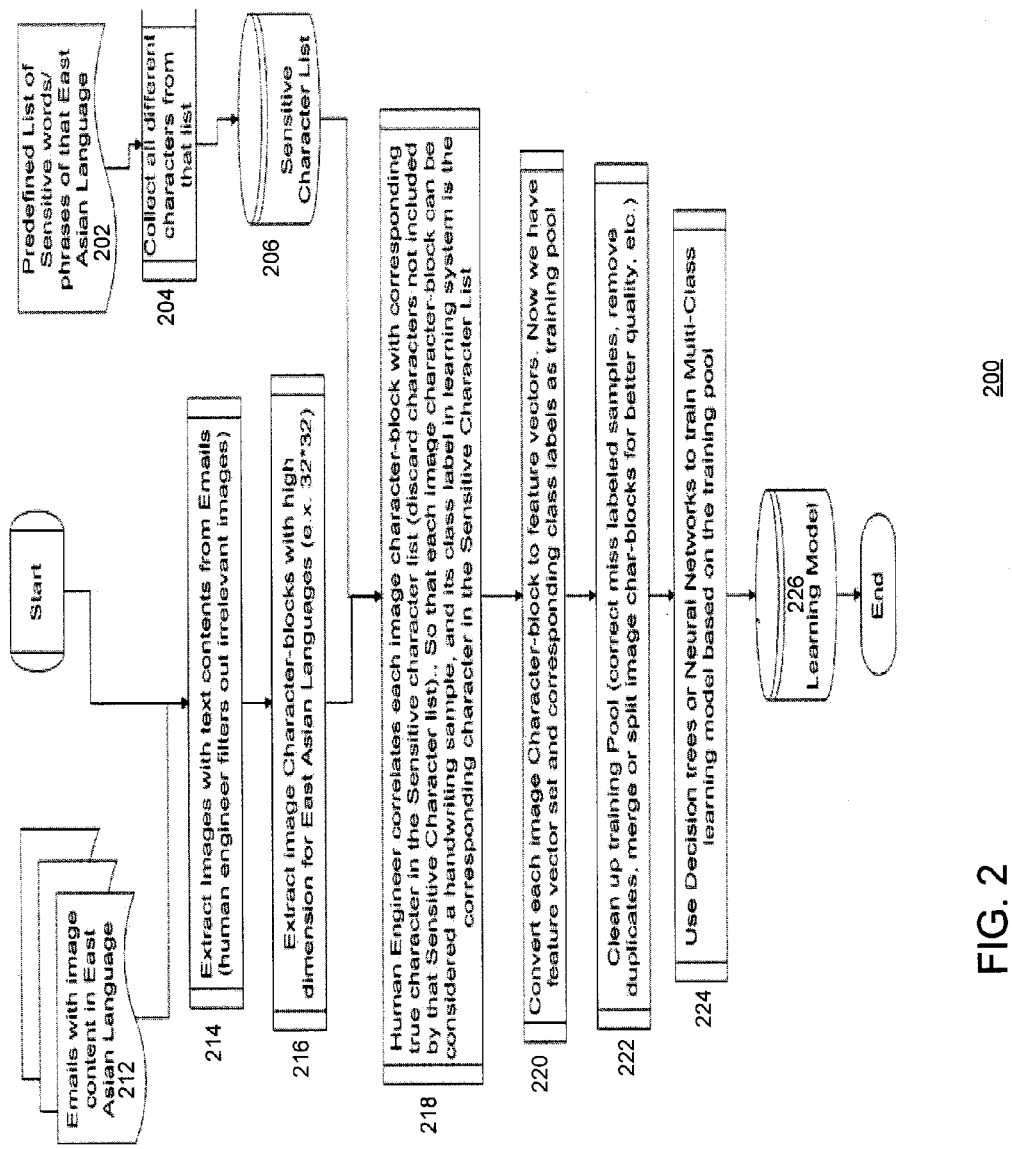
FIG. 2 is a flow diagram of a method for training a multi-class learning model in accordance with an embodiment of the present invention.

FIG. 2 is a flow diagram of a procedure 200 for training a multi-class learning model in accordance with an embodiment of the present invention. This training procedure 200 advantageously learns characteristics from various handwritten image samples of select East Asian language characters (classes).

According to FIG. 2, a pre-defined list of sensitive words and/or phrases or, more generally, a pre-defined list of sensitive expressions 202, for a given East Asian language is provided. All different characters from the pre-defined list may then be extracted and collected 204 so as to form or derive a sensitive character list 206. Each sensitive character in this list may be considered to be a class or category. By limiting the alphabet for the training procedure 200 to this derived sensitive character list 206, the class number for the learning system is substantially reduced (compared with all possible characters) which, in turn, improves the efficiency and accuracy of the application procedure 400.

Further according to FIG. 2, a set of sample electronic mail messages (emails) or other electronic messages with East Asian spam or other sensitive text content embedded in image data is prepared or provided 212. This set of sample emails is to be used for purposes of training the learning model. Image files with the spam or other sensitive text content are extracted 214 from the email samples. Furthermore, at this stage, irrelevant images may be filtered out by a human engineer, for example.

Figure 3:
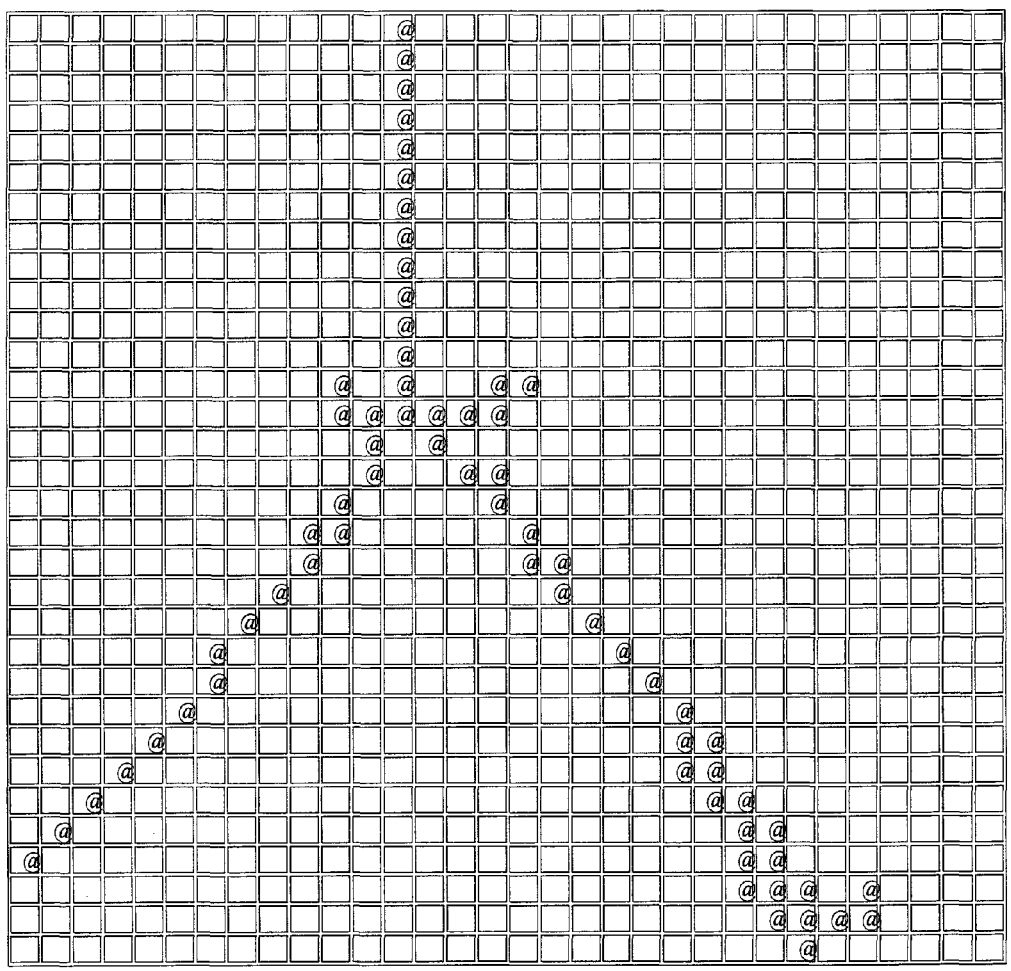
FIG. 3 depicts an example character block of a character of an East Asian language (Chinese).

Image character-blocks may then be extracted 216 from each image file. The image character-blocks are extracted at relatively high dimensions and then scaled to normalized dimensions. For example, according to an exemplary implementation, each extracted character-block may be normalized to be 32 times 32 pixels in dimension. An example of an extracted and normalized character-block is shown in FIG. 3. In FIG. 3, the "@" symbol means a pixel is set (pixel on), and a null means a blank pixel (pixel off) in the image.

In accordance with an exemplary implementation, the image character-blocks may be extracted by first gray-scaling the image. In other words, the image is converted into a grayscale format. A threshold for pixel values is selected and applied. Any pixels with a pixel value above this threshold may be defined as being set (binary one), while pixels with a pixel value below this threshold may be defined as being cleared (binary zero). Then, the process goes through each pixel that is set. There is an approach to determine if the current pixel belongs to an existing character block. A current pixel may be defined as belonging to an existing character block if it is connected to one or more set pixels belonging to the existing character block. If the current pixel does not belong to any existing character block, then a new character block is created, and the current pixel belongs to the new character block.

In the next step 218 illustrated, each image character-block may be correlated with a corresponding true character in the sensitive character list 206 or discarded if it does not correlate to any character in the sensitive character list 206. In other words, each image character-block is marked with a corresponding class label, if any, or discarded, if none. Accordingly, each image character-block is being regarded as a handwritten sample, and its class label in the learning system is the corresponding character, if any, in the sensitive character list 206.

Subsequently, each normalized image character-block (that was correlated to a character in the sensitive character list) may be converted 220 into feature vectors. In one exemplary implementation, the pixel on/off status in each row, column and/or diagonal of the normalized image character-block may be used, after merging consecutive same values, as features. Consider, for example, the image character-block in FIG. 3. For instance, the pixel status for row number 1 (the top horizontal line) is 00000000000010000000000000000000, or simply 010 after merging consecutive same values. And so on for the other rows. The pixel status for column number 1 (the leftmost vertical line) is 00010000000000000000000000000000, or simply 010 after merging consecutive same values. The pixel status for the diagonal from top-left to bottom-right is 00000000000011010000000000000000, or simply 01010 after merging consecutive same values. The pixel status for the diagonal going from bottom-right to top-left is 00000000000000010000000000000000, or simply 010 after merging consecutive same values. Similarly, the simplified pixel status may be determined for other or different rows, columns, and diagonals of the image character-block. These various simplified pixel status numbers may be considered to be features. A feature space may be constructed by collecting all the features for all of the image character-blocks. A feature vector may then be established for each image character-block. For example, if a feature appears in that image character-block, then a bit corresponding to that feature in the feature vector may be set to one. On the other hand, if the feature does not appear in that image character-block, then the corresponding bit may be set to zero. This results in a feature vector set and corresponding class labels for use as a training pool.

The training pool may then be cleaned up 222 before being used to train the learning model. For example, mislabeled samples may be corrected. Duplicate, contradictory, and low-quality samples may be removed. Image character-blocks may be merged or split for better quality. After the clean up, the training pool is ready to be used to train the machine learning model.

The multi-class learning or classification model may be trained 224 based on the training pool using decision trees or artificial neural networks, where the class number is the number of "sensitive characters". The output of the training procedure 200 is a learning model (a multi-class classification model) 226 which is generated by the training step 224. Further relevant description of decision trees and artificial neural networks is now given.

Figure 4:
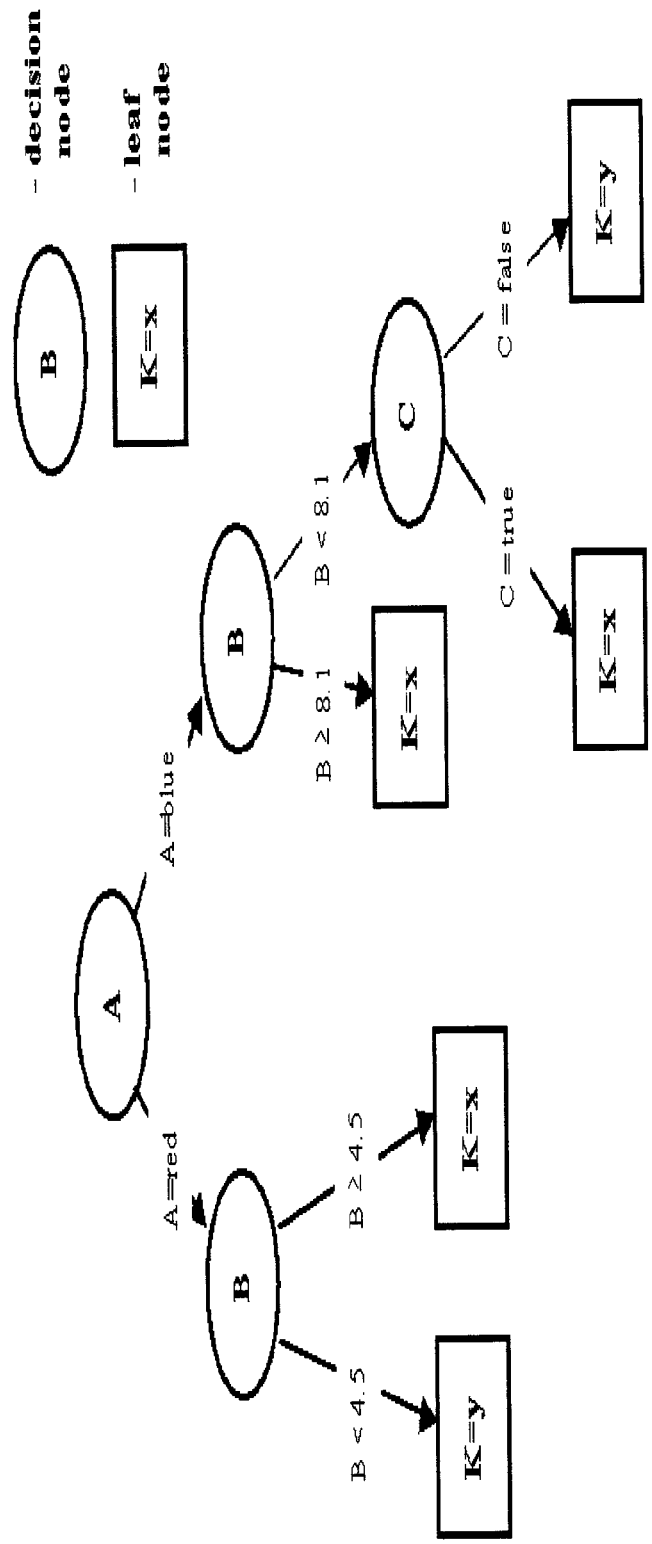
FIG. 4 depicts an example of a small decision tree.

A decision tree is a classifier in the form of a tree structure. See an example of a small decision tree as shown in FIG. 4. In a decision tree, each node is either a leaf node, or a decision node. A leaf node indicates the value of the target attribute (class) of samples. A decision node indicates some test to be carried out on a single attribute value, with one branch and sub-tree for each possible outcome of the test. In the example decision tree of FIG. 4, the decision nodes are depicted as ovals, and the leaf nodes are depicted as rectangles. The root of the tree in FIG. 4 is the decision node A. The decision tree may be utilized to classify a sample (K) by starting at the root of the tree and moving through it until a leaf node is reached. The leaf node provides the classification of the sample. Of course, the simple tree shown in FIG. 4 is an illustration for purposes of explanation only, the specific nodes and tests in an actual decision tree would be configured differently so as to be appropriate for use in the training step 226.

Using decision tree induction, a classification may be made after a number of judgments up to the height of the tree. The height of the tree is generally a limited number and will not vary much whether the class number is large or small. Hence, using a decision tree for classification is highly efficient in dealing with languages with large alphabets (such as East Asian languages). In this case, a machine learning algorithm establishes a multi-class classification model for all different classes—each class represents a distinct character of that language. A decision tree approach only establishes one learning model—a decision tree—to perform the classification. In comparison, most multi-class classification algorithms establish a learning model for each class. Hence, compared with most multi-class classification algorithms, the decision tree approach provides superior scalability when there are many classes.

An artificial neural network (ANN) is an information processing system that is inspired by way of biological nervous systems process information. An ANN is composed of a large number of highly interconnected processing elements (artificial neurons) working together. An ANN is configured for a specific application, such as pattern recognition or data classification, through a learning process. Learning in ANNs involves adjustments to the "synaptic" connections that exist between the artificial neurons. In this illustration, the weightings are depicted by the weightings of the arrows between the network elements. Of course, the simple ANN shown in FIG. 5B is an illustration for purposes of explanation only, the actual ANN would be larger and more complex so as to be appropriate for use in the training step 226.

Figure 5B:
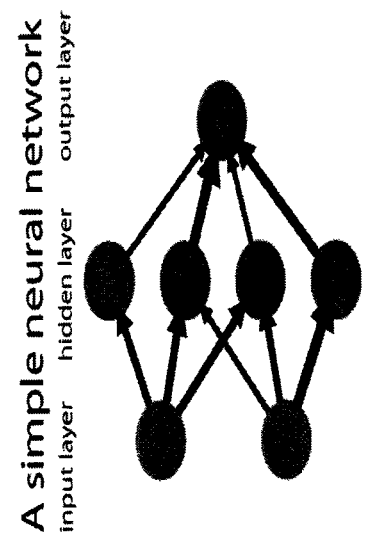
FIG. 5B depicts a simple artificial neural network.
Figure 5A:
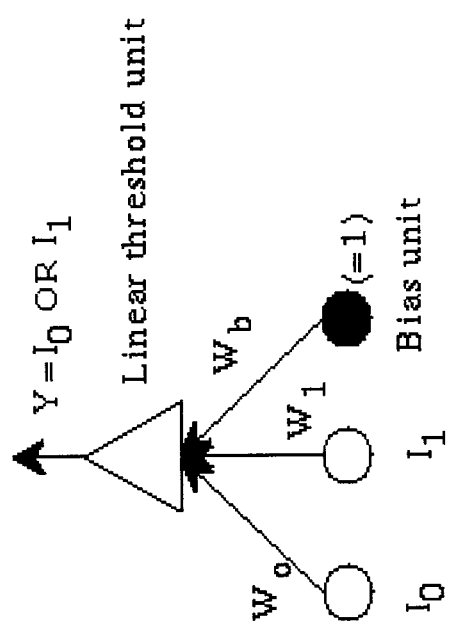
FIG. 5A depicts a simple single unit adaptive network element.

FIG. 5A depicts a simple single unit adaptive network element. Such an adaptive network element may be used as an artificial neuron in an ANN. In this case, all the inputs and outputs for the artificial neuron is binary. As shown, this simple network element has two inputs ($I_0$ and $I_1$) and a bias unit. The inputs and the bias unit are weighted ($W_0$, $W_1$, $W_b$) and the weighted values are provided to a linear threshold unit. The output (Y) of the network element is the output of the linear threshold unit.

FIG. 5B depicts a simple artificial neural network. This simple ANN is shown for explanatory purposes and includes an input layer, a hidden layer, and an output later. Each of the input and hidden layers includes multiple adaptive network elements. Once the ANN is trained, the network structure is settled and so does not change. As seen from FIG. 5B, the number of layers needed by the ANN would be of limited number and will not vary much whether the class number is large or small. Hence, using an ANN for classification is highly efficient in dealing with languages with large alphabets (such as East Asian languages).

Figure 6:
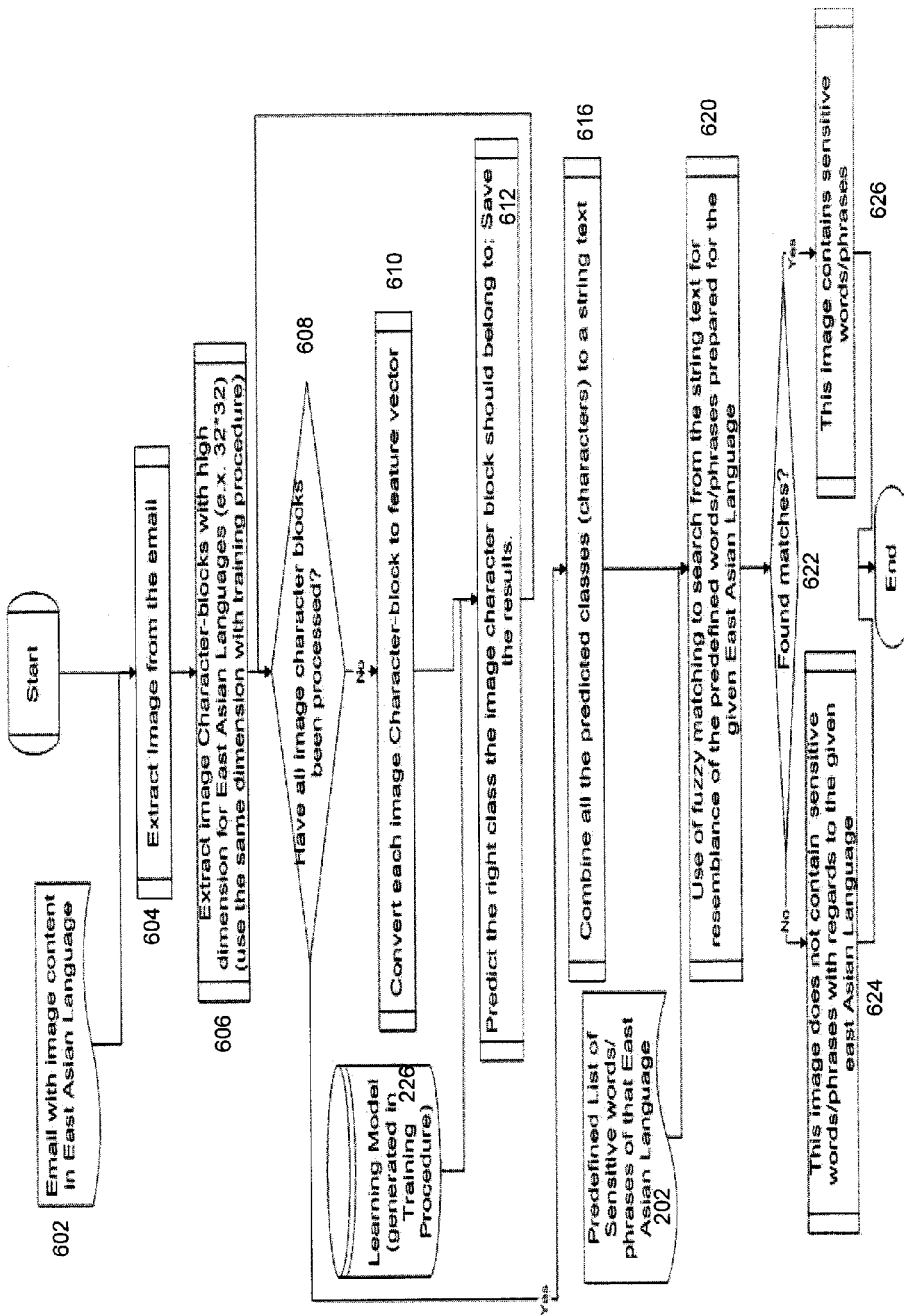
FIG. 6 is a flow diagram of a method of identifying sensitive words and/or phrases in images for languages with large alphabets in accordance with an embodiment of the present invention.

FIG. 6 is a flow diagram of a procedure 600 (i.e. application procedure) of identifying sensitive words and/or phrases in images for languages with large alphabets in accordance with an embodiment of the present invention. In summary, this application procedure extracts corresponding character-blocks from images (one by one, or line by line) and normalizes them to appropriate dimensions. The normalized character-blocks are represented by feature vectors with predefined features, and candidate classes (i.e. characters) to which the character-blocks may belong are estimated or determined. The recognized characters (classes) are combined to strings, and fuzzy string matching searches may be performed from the recognized strings to search for pre-defined sensitive words and/or phases in the corresponding East Asian language.

As shown in FIG. 6, an email message 602 with image content in an East Asian language is received. The image is extracted 604 from the email. Subsequently, image character-blocks are extracted 606 from the image. The image character-blocks are preferably extracted with relatively high dimensions. For example, according to an exemplary implementation, each extracted character-block may be normalized to be 32 times 32 pixels in dimension. The normalized dimensions in the application procedure 600 are the same dimensions as the normalized dimensions in the training procedure 200.

Thereafter, the image character-blocks are processed (blocks 608, 610, 612). A determination may be made 608 as to whether all the image character-blocks have been processed. If not, then each image character-block may be converted 610 to a feature vector. An exemplary method for conversion of an image character-block to a feature vector is described above in relation to FIG. 3. Using the feature vector, a prediction 612 is made as to the correct class to which the image character-block belongs, and the prediction results are saved. The learning model 226 generated in the training procedure is utilized to make this prediction in an advantageously rapid manner.

Once all the image character-blocks have been processed, then all the predicted classes (i.e. all the predicted East Asian language characters) may be combined 616 into a text string. Fuzzy string matching may then be used to search 620 the text string for a resemblance of the words and/or phrases from the predefined list 202. Fuzzy string matching is a modified version of accurate string matching algorithms (such as Viterbi or dynamic programming algorithms) to find similarities between string texts. If the resemblance (similarities) exceeds a threshold, then a match (i.e. a fuzzy match) is deemed to have been found.

If it is determined 622 that no match is found, then an indication 624 may be given that the image does not contain sensitive words and/or phrases with regards to the given East Asian language. On the other hand, if it is determined 622 that a match is found, then an indication 626 may be given that the image contains sensitive words and/or phrases.

The solution described above uses decision trees and/or neural networks to provide a rapid and accurate technique for identifying sensitive words and/or phrases in images. The solution is particularly useful for languages with large alphabets, such as East Asian languages.

The present application also discloses a hybrid solution which combines the merits of decision trees/neural networks and support vector machines (SVM) to quickly and accurately identify sensitive words and/or phrases in images for East Asian languages. Although multi-class SVM classifiers are generally much slower than decision trees/neural networks for East Asian languages when there are many classes, a 2-class SVM classifier may be more precise than 2-class decision trees or neural networks. Hence, this hybrid solution splits a large alphabet of an East Asian language into different groups (or segments) of characters. The correct group of characters may be rapidly identified by decision trees/neural networks with satisfactory precision, and subsequently a multi-class SVM classifier may be used to accurately identify the correct character within the identified group. Each group preferably contains a number of characters which is comparable to the number of characters in a Western language (for example, less than one hundred characters in the group).

Figure 7:
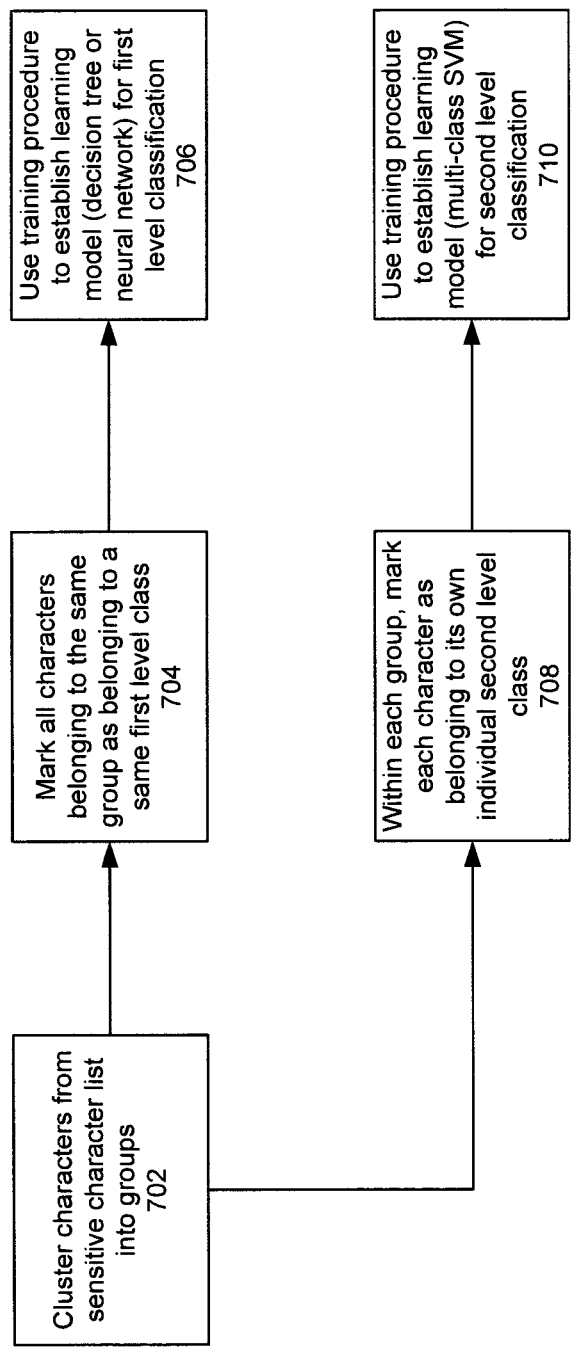
FIG. 7 is a flow chart depicting a hybrid training procedure to establish the hierarchical learning system in accordance with an embodiment of the invention.

FIG. 7 is a flow chart depicting a hybrid training procedure 700 to establish the hierarchical learning system in accordance with an embodiment of the invention. The training procedure results in a first level (rough) classification learning model and a second level (fine) multi-class SVM model.

First, the characters in the sensitive character list are clustered 702 into a number of groups (or segments). Next, all characters belonging to the same group are marked 704 as belonging to a same first level class. Then, training procedures of decision trees or artificial neural networks, as appropriate, are used 706 to establish the machine learning models for the first level classification.

In addition, within each group, each character is marked 708 as belonging to its own individual second level class. Training procedures are then used to train 710 a multi-class SVM model composed of many 2-class SVM models so as to be able to identify individual characters.

Figure 8:
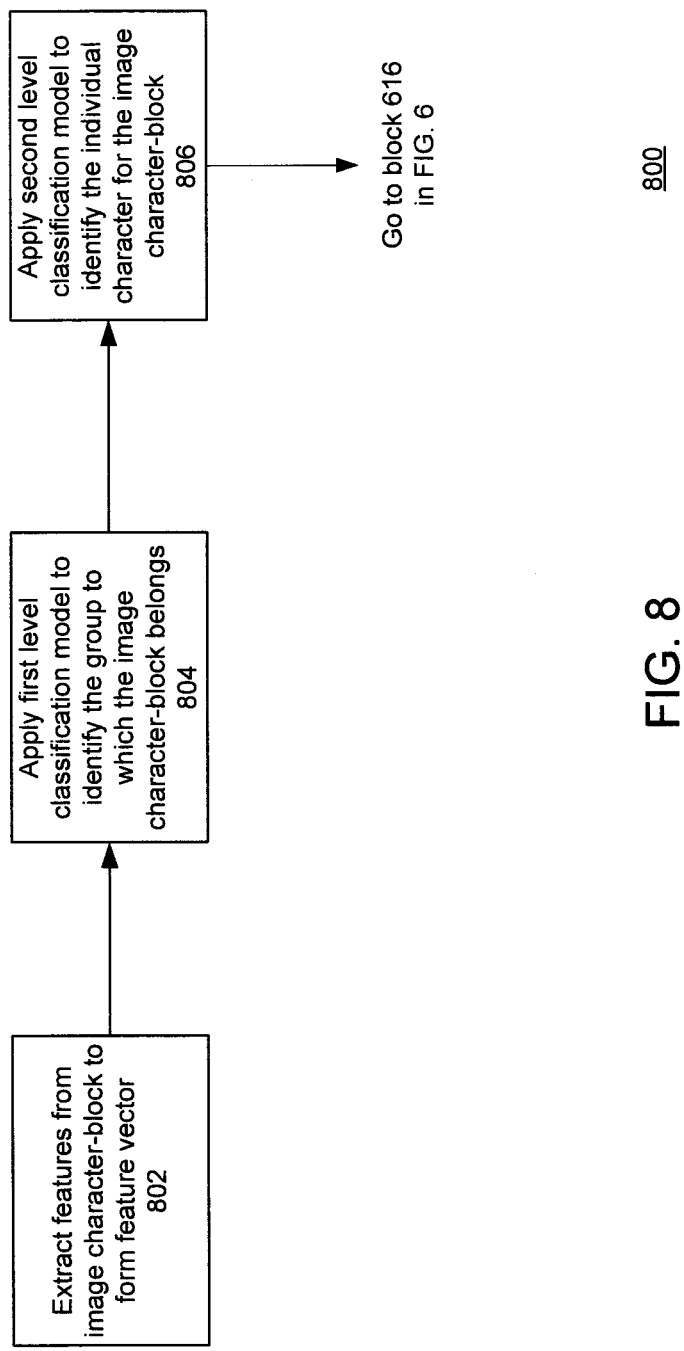
FIG. 8 is a flow chart showing a hybrid application procedure for identifying sensitive words and/or phrases in images for languages with large alphabets in accordance with an embodiment of the invention.

FIG. 8 is a flow chart showing a hybrid application procedure 800 for identifying sensitive words and/or phrases in images for languages with large alphabets in accordance with an embodiment of the invention. For a given image character-block, features are extracted 802 to form a feature vector. The first level classification learning model (decision tree or artificial neural network) is then applied 804 to identify the group to the image character-block belongs. Thereafter, the second level classification learning model (multi-class SVM) is applied 806 to identify the individual character for the image character-block. Thereafter, the procedure 800 may follow the steps shown in FIG. 6 starting at block 616 where all the predicted classes (identified characters) are combined into a string text, and so on.

Figure 9:
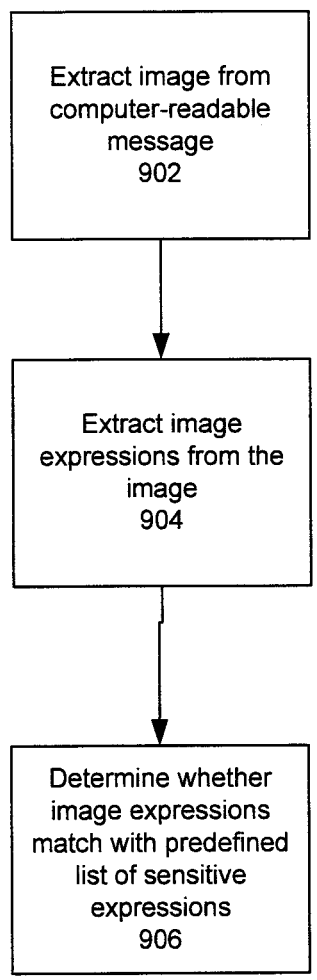
FIG. 9 is a flow chart depicting another method of detecting sensitive expressions in images in accordance with an embodiment of the invention.

FIG. 9 is a flow chart depicting another method 900 of detecting predefined sensitive expressions in images. The method 900 is performed by a computer and includes (i) extracting an image from a computer-readable message (block 902), (ii) extracting image expressions from the image (block 904), and (iii) determining whether the image expressions match with a predefined list of sensitive expressions (block 906). Image expressions refer to textual expressions that are embedded in image data.

Said determining may be performed using a multi-class learning model, wherein each class represents a distinct sensitive expression. The method 900 may be implemented using dynamic programming. Advantageously, this method 900 provides an efficient and robust technique for detecting sensitive expressions from a predefined list in images embedded in messages. The sensitive expressions may be in a language with a large alphabet (such as East Asian languages).

Improved techniques for identifying sensitive words and/or phrases in images for languages with large alphabets have been disclosed. These techniques provide efficient and accurate solutions to extract East Asian language content which is embedded in image data and to find sensitive expressions in the East Asian language content. Advantageous applications include, but are not limited to, 1) an anti-spam engine to detect image spam emails or messages, and 2) content filtering compliance where an information technology manager has expressions, such as "confidential information," written in an East Asian language which indicates that the content should be controlled or filtered prior to the content leaving a secure computing network.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying sensitive expressions in images for a language with a large alphabet, the method to be performed using a computer and comprising:
    extracting an image from a computer-readable message;
    extracting image character-blocks from the image;
    predicting characters to which the character-blocks correspond using a multi-class learning model, wherein the multi-class learning model is trained using a derived list of sensitive characters which is a subset of the large alphabet;
    combining the predicted characters into string text; and
    searching the string text for matches with a predefined list of sensitive expressions in the language with the large alphabet.

2. The method of claim 1, wherein the mufti-class learning model comprises a decision tree.

3. The method of claim 1, wherein the multi-class learning model comprises an artificial neural network.

4. The method of claim 1, wherein predicting a character to which a character-block corresponds comprises converting the character-block to a feature vector.

5. The method of claim 4, wherein the feature vector comprises a string of bits where each bit corresponds to presence or absence of a feature in the character-block.

6. The method of claim 1, wherein said searching comprises using fuzzy matching to search in the string text for a resemblance of the sensitive expressions from the predefined list.

7. The method of claim 1, further comprising:
    indicating that the image contains a sensitive expression if a match is found.

8. The method of claim 1, wherein said extracting the image character-blocks comprises:
    gray-scaling the image to generate grayscale pixel data;
    applying a threshold to the grayscale pixel data to generate binary pixel data; and
    defining set binary pixels connected to each other as belonging to a same character-block.

9. The method of claim 1, wherein the large alphabet is over two thousand distinct characters.

10. The method of claim 1, wherein the derived list of sensitive characters has less than two hundred distinct characters.

11. A method of training a multi-class learning model so that the model predicts characters to which image character-blocks correspond, the method to be performed using a computer and comprising:
    providing a set of sample messages with sensitive expressions in a language with a large alphabet, wherein the sensitive expressions are embedded in images;
    extracting said images from the sample messages;
    extracting image character-blocks from said images;
    receiving correlations between the image-character blocks and corresponding characters in said language;
    converting the image character-blocks to feature vectors with the corresponding characters as class labels for the feature vectors; and
    using the feature vectors and the class labels to train said learning model.

12. The method of claim 11, wherein the feature vector comprises a string of bits where each bit corresponds to presence or absence of a feature in the character-block.

13. The method of claim 11, wherein extracting an image character-blocks from an images comprises:
    gray-scaling the image to generate grayscale pixel data;
    applying a threshold to the grayscale pixel data to generate binary pixel data; and
    defining set binary pixels connected to each other as belonging to a same character-block.

14. The method of claim 11, wherein the large alphabet is over two thousand distinct characters, and wherein the sensitive expressions have a total of less than two hundred distinct characters.

15. A method of identifying sensitive expressions in images, the method to be performed using a computer and comprising:
    extracting an image from a computer-readable message;
    extracting image expressions from the image; and
    determining whether the image expressions match with a predefined list of sensitive expressions using a multi-class learning model where each class in the model represents a distinct sensitive expression.

16. The method of claim 15, wherein the sensitive expressions are in a language with a large alphabet of over two thousand distinct characters, and the sensitive expressions have a total of less than two hundred distinct characters.

17. The method of claim 15, wherein the multi-class learning model comprises a decision tree.

18. The method of claim 15, wherein the multi-class learning model comprises an artificial neural network.

19. The method of claim 1, wherein the list of sensitive characters is derived from a predefined list of sensitive expressions.

20. The method of claim 19, wherein the large alphabet comprises characters of an East Asian language.

* * * * *

UNITED STATES PATENT AND TRADEMARK OFFICE
CERTIFICATE OF CORRECTION

| | | |
|---|---|---|
| PATENT NO. | : 8,699,796 B1 | Page 1 of 1 |
| APPLICATION NO. | : 12/268714 | |
| DATED | : April 15, 2014 | |
| INVENTOR(S) | : Diao et al. | |

It is certified that error appears in the above-identified patent and that said Letters Patent is hereby corrected as shown below:

In the Claims

Claim 2, column 9, line 36, after "wherein the" and before "learning" delete, "mufti-class" and replace it with -- multi-class --

Signed and Sealed this
Twenty-second Day of July, 2014

Michelle K. Lee
*Deputy Director of the United States Patent and Trademark Office*